US007227650B2

(12) United States Patent
Rodriguez

(10) Patent No.: US 7,227,650 B2
(45) Date of Patent: Jun. 5, 2007

(54) OUTPUT HANDLING OF PRINTED MEDIA

(75) Inventor: Hector Rodriguez, Loma Bonita Guadalajara Jalisco (MX)

(73) Assignee: Hewlett-Packard Development Company, L.P., Houston, TX (US)

( * ) Notice: Subject to any disclaimer, the term of this patent is extended or adjusted under 35 U.S.C. 154(b) by 1295 days.

(21) Appl. No.: 09/816,820

(22) Filed: Mar. 22, 2001

(65) Prior Publication Data

US 2002/0135791 A1 Sep. 26, 2002

(51) Int. Cl.
*G06K 15/00* (2006.01)
*G06F 3/12* (2006.01)

(52) U.S. Cl. .................................... 358/1.12; 358/1.13

(58) Field of Classification Search ........ 358/1.1–1.18; 399/397, 405, 377; 271/225, 298, 185, 281
See application file for complete search history.

(56) References Cited

U.S. PATENT DOCUMENTS 4,591,884 A * 5/1986 Miyamoto et al. .......... 347/153
5,898,592 A * 4/1999 Salgado et al. ............. 700/214
5,905,520 A * 5/1999 Fujii et al. .................. 347/153

* cited by examiner

*Primary Examiner*—Douglas Q. Tran

(57) ABSTRACT

A printing system includes a printer and a first accessory device coupled to receive printed pages from the printer. The first accessory device contains a straight-through paper path and a reversing paper path. The straight-through paper path maintains the printed pages in the same order as received from the printer. The reversing paper path reverses the order of the printed pages received from the printer. The printing system also includes a second accessory device coupled to receive printed pages from the first accessory device.

22 Claims, 5 Drawing Sheets

OUTPUT HANDLING OF PRINTED MEDIA

TECHNICAL FIELD

The invention relates to devices that produce images on media, such as printers, copiers, and facsimile machines. More particularly, the invention relates to a media handling device that is capable of controlling the output ordering of multiple sheets of media.

BACKGROUND

Printer technology continues to advance, resulting in commercially available printers having faster speed, increased print quality, and improved features. A wide range of printers are commercially available, ranging from relatively inexpensive "desktop" models with few features to more expensive "printing press" models that have many features and expandable options.

Many printers offer optional accessories that are attached to the output of the printer. One or more of these optional accessory devices may be connected serially to perform various functions, such as binding documents, stapling documents, hole-punching documents, or depositing a document into an appropriate mailbox. When passing documents through certain accessory devices, it is important that the various pages of the document be handled in the proper order. For example, before stapling or binding a document, the document pages must be arranged in the correct order. Many printers generate output in the reverse order (i.e., the first page is printed face-up, the next page is printed face-up and placed on top of the first sheet, and so on).

One technique to reverse the order of multiple printed pages is referred to as electronic flipping. For a printer that prints on one side of the paper (referred to as simplex printing), the printer receives and processes the entire print job internally, and then prints the pages in reverse order (i.e., prints the last page first, then the next-to-the-last page, and so on). This technique requires that the printer have enough memory to receive and process the entire print job prior to printing the first page of the print job. This technique typically slows the printing operation because the entire document must be processed before printing any pages. Further, this technique becomes more complicated when the print job is printed on both sides of the paper (referred to as duplex printing). When printing on both sides of the paper, the printer cannot merely reverse the order of the print job. The printer may need to modify the order in which the page faces are printed because the printer assumes that it will output the pages through an output that performs a mechanical flipping operation. Additionally, the printer may need to insert blank pages (or blank page faces) when printing an odd number of pages.

Some applications are capable of generating print jobs in an inverted manner. If an application supports this type of processing, it generally takes a considerable amount of time to generate the print job. Further, many applications are not capable of generating this type of inverted print job.

Another system to reverse the order of multiple printed pages is referred to as a mechanical flipper. A mechanical flipper physically receives an entire sheet of paper and mechanically flips the paper, then provides the flipped sheet of paper to the output. A problem with this system is the requirement of a dedicated mechanical device to flip each sheet of paper, which represents additional cost and complexity, extra power consumption, and increased printer noise.

The invention described herein addresses these and other problems using an improved system for reversing the order of document pages.

SUMMARY

The embodiments discussed herein provide a mechanism that reverses the order of document pages without requiring the printer or other processing device to receive the entire print job before printing or processing a page. Further, the embodiments discussed herein do not require a mechanical flipper of the type discussed above and do not require an application that can generate an inverted print job.

According to one aspect of the invention, a printing system includes a printer and a first accessory device coupled to receive printed pages from the printer. The first accessory device contains a straight-through paper path and a reversing paper path to reverse the order of the printed pages received from the printer.

In one implementation of the invention, the printer has an output coupled to the first accessory device, such that the first accessory device receives printed pages from the printer output.

According to another aspect of the invention, a second accessory device is coupled to receive printed pages from the first accessory device. The second accessory device contains a straight-through paper path and a reversing paper path to reverse the order of the printed pages received from the first accessory device.

According to another aspect of the invention, the straight-through paper path maintains the printed pages in the same order as received from the printer.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

Figure 1:
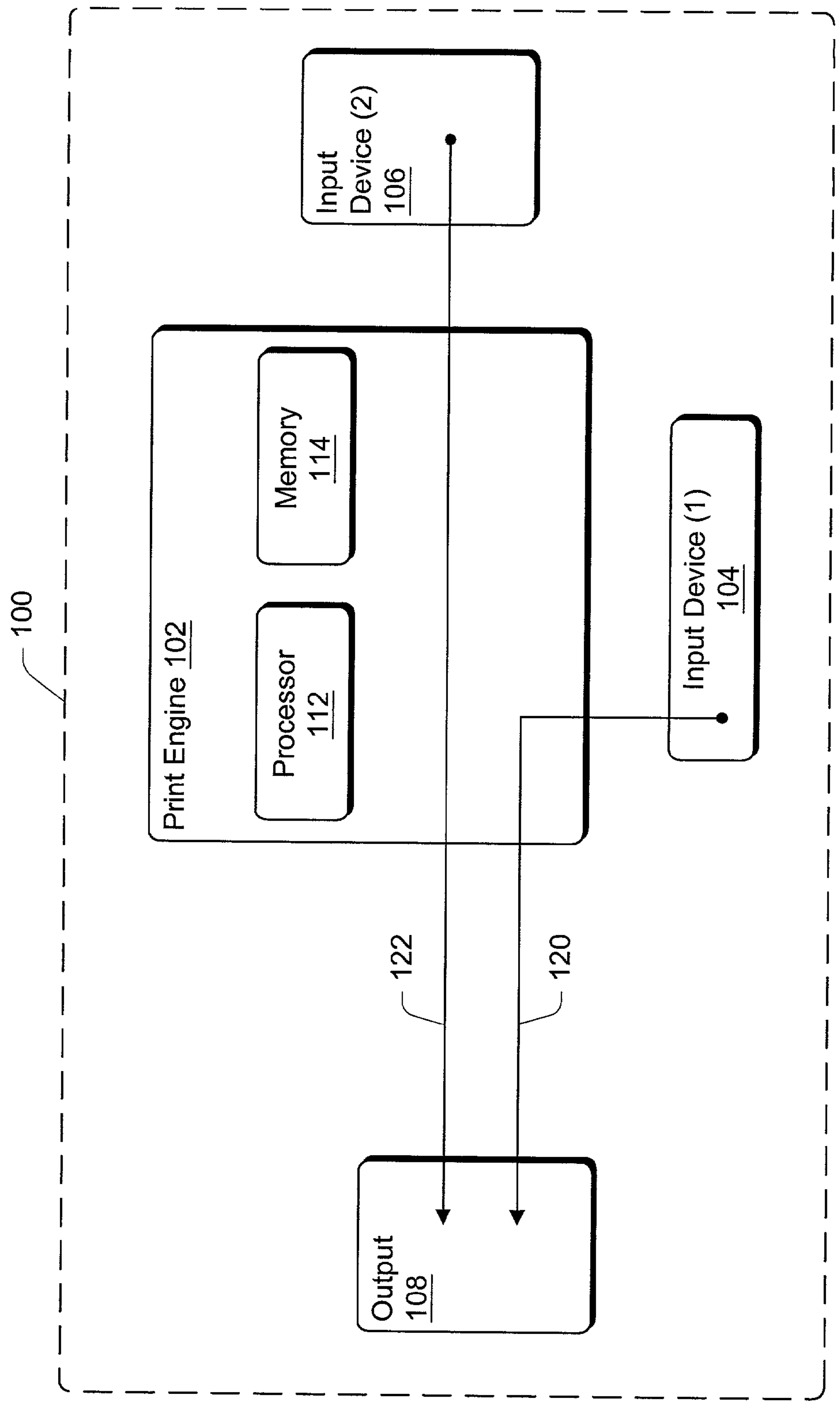
FIGS. 1 and 2 illustrate exemplary printers in accordance with embodiments of the invention.

FIG. 1 is a block diagram illustrating an exemplary printer in accordance with an embodiment of the invention. As used herein, a printer refers to any type of device that can generate an image (e.g., a letter, a picture, a drawing, etc.) on media, such as paper, plastic, or fabric. Example devices include impact printers, non-impact printers, digital copiers, analog copiers, facsimile machines, press machines, silk screen machines, etc. Printers can produce images in any of a wide variety of conventional print media (paper, plastic, fabric, etc.). However, for ease of discussion, printers are discussed herein in the context of printing on paper.

A printer 100 includes a print engine 102 and a pair of input devices 104 and 106. The printer 100 also has at least one output device 108. During a printing operation, a sheet of paper is provided to print engine 102 from one of the input devices 104 or 106, or from a direct paper feed (e.g., an external direct-feed tray). As the sheet of paper passes through the print engine 102, the appropriate information is printed on the paper. The paper can be printed in any of a wide variety of conventional manners, such as a conventional laser printing process or a conventional inkjet printing process. After printing, the sheet of paper is output directly by print engine 102 to an output 108, such as an output bin (or output tray), or other device capable of outputting the sheet of paper from the printer. The output 108 may be coupled to another device (not shown) that further processes the sheet of paper. This further processing is discussed in greater detail below.

Input devices 104 and 106 represent a variety of print medium sources and pre-processing devices. Examples of input devices 104 and 106 include: a device with one or more paper trays for supplying one or more sizes or types of paper to print engine 102; a pre-processing device to put a "stamp" on each sheet of paper prior to printing (such as physically adding a stamp to the sheet of paper or adding a graphical image or text to the information for each page); a paper separating device that separates fan-folded media into separate sheets or to cut a sheet of paper from a roll of paper; a device to affix another piece of paper to the sheet for printing (e.g., a Post-It® Note); a hole punching device to punch hole(s) in each sheet of paper; or a scanning device, such as to obtain a serial number or other identifier from a sheet of paper to verify that pre-printed media is oriented correctly for printing.

Print engine 102, input devices 104 and 106, and output 108 can communicate with one another, transferring control information and data as necessary. Such communication may occur directly between two devices, or may be routed through print engine 102. Printer 100 includes additional components, such as a print head or other mechanism for producing the data to be printed on the print medium in print engine 102.

Print engine 102 includes a processor 112 and a memory/storage device 114. Processor 112 controls the transfer of a print medium through printer 100, including communication of information to the input devices 104 and 106, and the output device 108. As discussed below, processor 112 may also communicate information to other devices coupled to printer 100. Processor 112 may be any type of microprocessor or microcontroller capable of performing the operations necessary to control the operation of printer 100. Alternatively, processor 112 may be replaced by an ASIC (application specific integrated circuit) or other customized device capable of controlling the printer 100.

Memory 114 is a volatile and/or nonvolatile memory, such as a RAM (random access memory), a ROM (read only memory), a Flash EEPROM (electronically erasable programmable read only memory), or a magnetic or optical storage device. Memory 114 stores various information generated and/or used during the operation of the printer 100. Although memory 114 is illustrated as being separate from processor 112, alternatively all or part of memory 114 may be incorporated into processor 112.

Figure 2:
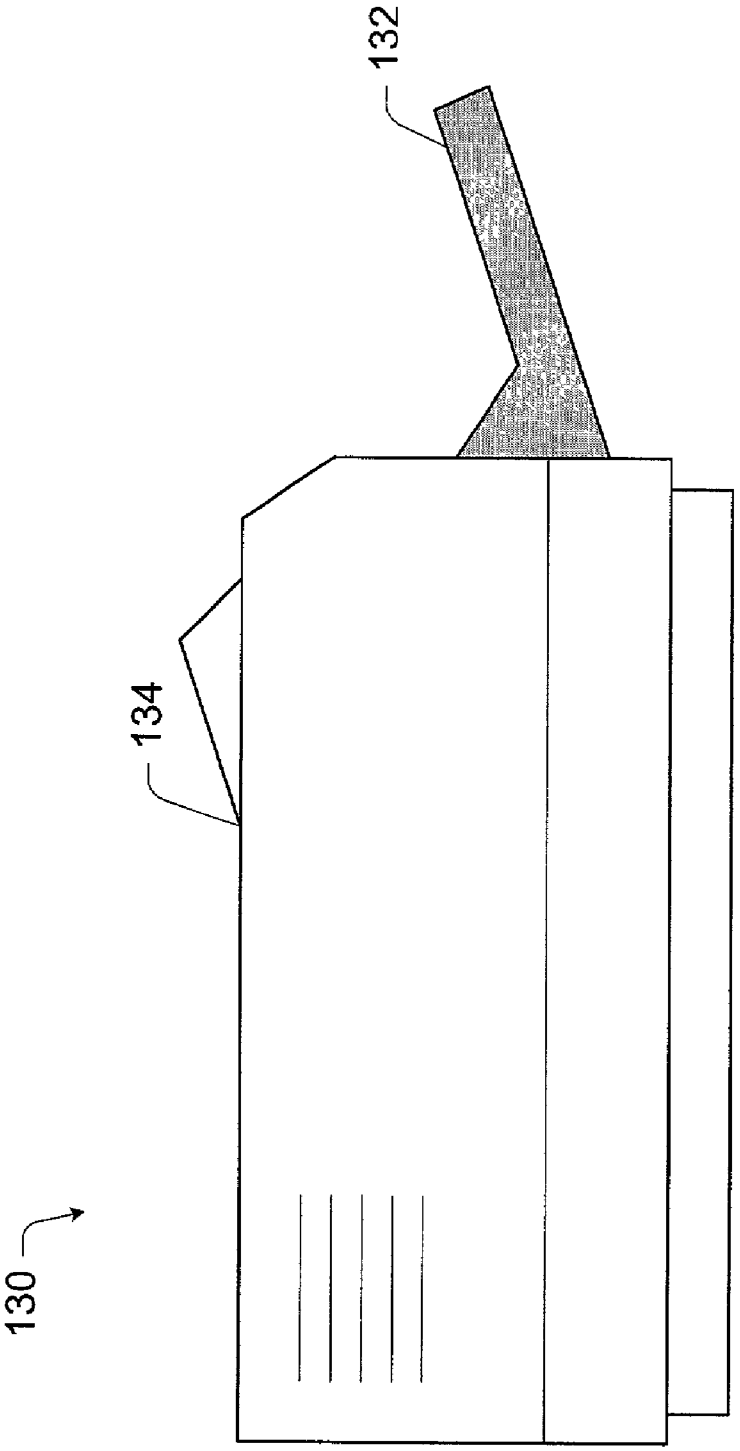

FIG. 2 illustrates an exemplary printer 130. Printer 130 may be the print engine 102 of FIG. 1. For example, an input tray 132 is a paper source and an output bin 134 on top of the printer 130 collects the printed pages after printing. Alternatively, printer 130 can be the combination of print engine 102, output 108, and an input device 104 or 106.

Figure 3:
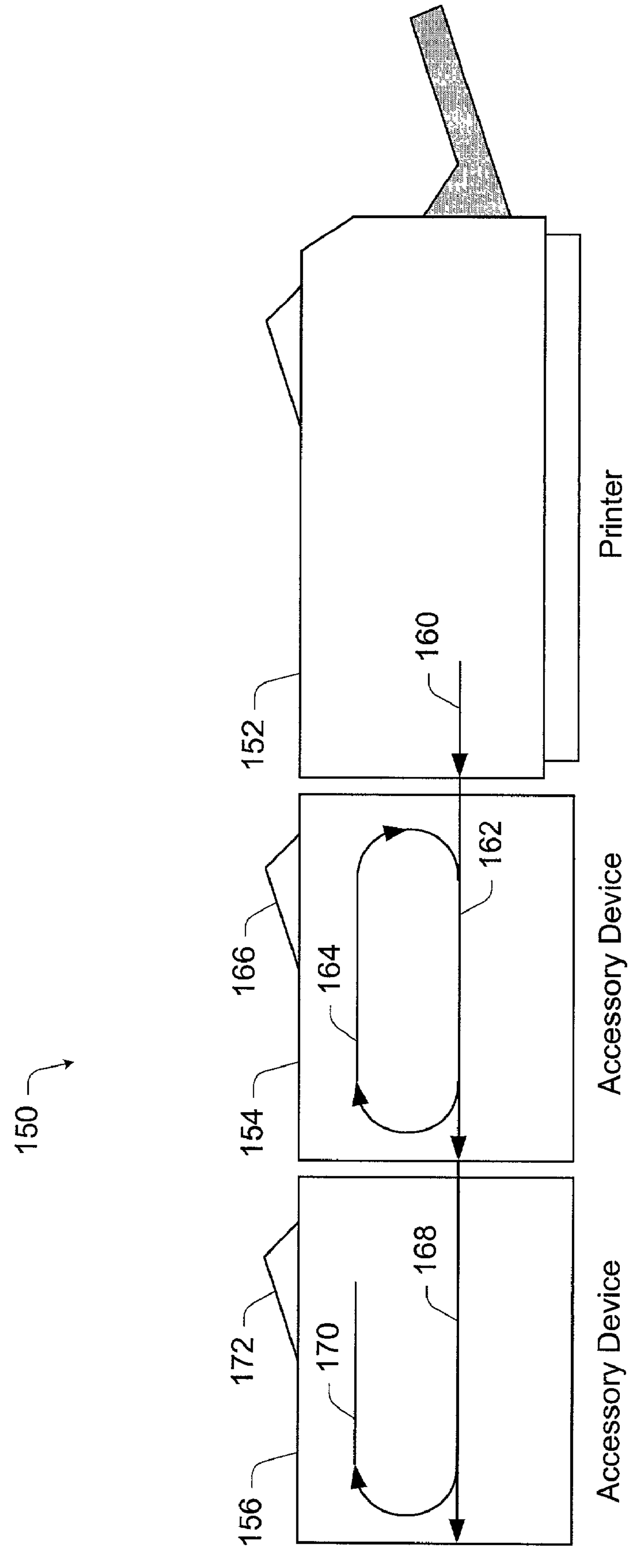
FIG. 3 is a block diagram showing a printing system including an exemplary printer and two accessory devices serially coupled to the printer.

FIG. 3 is a block diagram showing a printing system 150 including an exemplary printer 152 and two accessory devices 154 and 156 serially coupled to the printer. The two accessory devices 154 and 156 can be any type of device that further processes one or more sheets of paper, such as a paper sorter; a paper folder; a stapler; a hole punch; a gluing/binding device; a booklet maker to organize, fold, and bind the output as appropriate for a booklet; a device to stuff the paper into an envelope and optionally seal the envelope; a device to add job dividers such as covers or colored paper; a shrink wrap device to wrap the printed sheets; a device to add tabbed section dividers; a perforating device to perforate the printed sheets; a device to cut an arbitrary shape in the printed sheets; a laminator to laminate all or a part of a sheet (e.g., only the tabs); a mailbox device with different locations to receive printed sheets for different individuals; an embosser to emboss the printed sheets; a device to remove pieces of paper affixed to the sheet of paper for printing (e.g., Post-It® Notes); a device to affix ink from a just-printed medium to transfer onto cloth (e.g., iron onto a t-shirt); or a shredder.

Each accessory device 154 and 156 includes a "straight-through" paper path (i.e., path 162 in accessory device 154 and path 168 in accessory device 156) and a "reversing" paper path (i.e., path 164 in accessory device 154 and path 170 in accessory device 156). The reversing path 164 in accessory device 154 can either output the print job in the "reversed" order or can put the paper (or other media) back onto the straight-through path 160. Note that if the paper is put back onto the straight-through path 160, the print job is reversed again such that it is in the original order as received by the device. In contrast, the reversing path 170 in accessory device 156 can output the print job in "reversed" order, but cannot put the paper back onto the straight-through path 168. Additional details regarding different types of paper processing within an accessory device are provided below.

The printer's straight through path 160 can be coupled to path 162 of accessory device 154, which allows printed sheets from printer 152 to be processed by accessory device 154. Similarly, the output of path 162 can be coupled to path 168 of accessory device 156, which allows the printed sheets received from accessory device 154 to be processed by accessory device 156. The output of path 168 can be coupled to other accessory devices (not shown) for further processing of the printed sheets. Although FIG. 3 illustrates a printer 152 and two accessory devices 154 and 156, the teachings of the present invention can be applied to any number of accessory devices coupled to a printer and/or other accessory devices in the manner shown in FIG. 3.

The "reversing" paper paths (path 164 and path 170) reverse the orientation of a sheet of paper. For example, printer 152 typically outputs printed sheets from path 160 such that the printed side of the document (or the first side in the case of a two-sided document) is up (i.e., face-up). This orientation is referred to as "reverse order" because the first sheet will be printed face up, then the next sheet is placed (face-up) on top of the first sheet, and so forth, finishing with the last sheet on top. Many accessory devices (such as staplers or binding devices) require that the printed sheets be in the correct order before processing. In this situation, the accessory device uses its own "reversing" paper path to put the printed sheets in the correct order. The sheets can then be processed by the accessory device and either deposited in the device's output tray (e.g., tray 166 or tray 172) or passed to the next accessory device for further processing.

The last accessory device in the "chain" (i.e., the accessory device farthest from the printer) may not have a straight-through paper path, because the accessory device does not couple its output to another accessory device. Thus, the last accessory device in the chain may have one or more paper paths that terminate at a paper tray or other output mechanism. Alternatively, the last accessory device may have a straight-through paper path that is temporarily disabled for as long as the accessory device is the last device in the "chain." In another embodiment, the straight-through paper path of the last device in the "chain" ends in an output tray, which is useful for media such as heavy paper, labels, and other media that should not be bent.

Although a sheet of paper passes through an accessory device, the accessory device does not necessarily "process" the paper. For example, a particular accessory device may punch holes in each printed sheet such that the sheets can be stored in a three-ring binder. If a particular print job does not require hole punches, that accessory device simply passes the print job through the device using its straight-through paper path. Further, certain print jobs may require that different sheets receive different processing. For example, a particular sheet in a print job may be laminated (such as a cover page), while other sheets in the same print job are not laminated. In this example, the accessory device that laminates printed sheets will process (i.e., laminate) the cover page, but not process the remaining sheets in the print job. Thus, the remaining sheets simply pass through the laminating accessory device on the straight-through paper path.

The instructions received by the printer as part of the print job indicate what processing is required for the print job or for particular pages in the print job. For example, the instructions may indicate that the entire print job is to be hole punched, the first sheet is to be laminated, colored sheets should be inserted at various locations in the print job, and an arbitrary shape is to be cut into the last sheet. The instructions received by the printer are communicated to each of the attached accessory devices so that the accessory devices know how to process the print job. One or more accessory devices may also communicate instructions to the printer requesting the printer to stop sending sheets into the devices to allow for the processing time required by the device. For example, if the device is one that reverses the order of the sheets before processing the sheets and reinserts the sheets back into the straight-through path, the device will ask the printer to stop sending sheets until all processed pages have been reinserted into the straight-through path. The device will then instruct the printer to resume sending sheets.

For example, a printer receives a print job that contains "job commands" and "page description commands." The job commands are commands that affect the entire print job and the page description commands are commands that affect a particular page or sheet in the print job. Several page description languages are available to control the processing of individual pages, such as PostScript, developed by Adobe Systems Incorporated of San Jose, Calif., or PCL (printer control language), developed by Hewlett-Packard Company of Palo Alto, Calif. An example job control language is PJL (printer job language), developed by Hewlett-Packard Company.

When the printer receives a print job, it parses the print job and uses a separate protocol to communicate with the accessory devices (e.g., to request different types of processing). The instructions for the accessory devices may be stored at the beginning of the print job or may be embedded elsewhere in the print job. In a particular embodiment, the instructions for the accessory devices are stored at the beginning of the print job, which allows the printer to verify that the necessary resources are available before starting to process the print job. If the resources are not available, then the printer can skip the print job until all of the necessary resources are available to process the print job.

For example, if a particular print job requires stapling of the entire job at the end of the process, a command indicating this processing is located at the beginning of the print job. The printer parses this command before starting to print and checks to see whether the stapling device is available (e.g., functioning properly and contains the necessary staples). If the stapling device is out of staples, the printer can return the print job to the queue, notify the user or administrator of the printer, and start processing the next job in the queue.

Figure 4A:
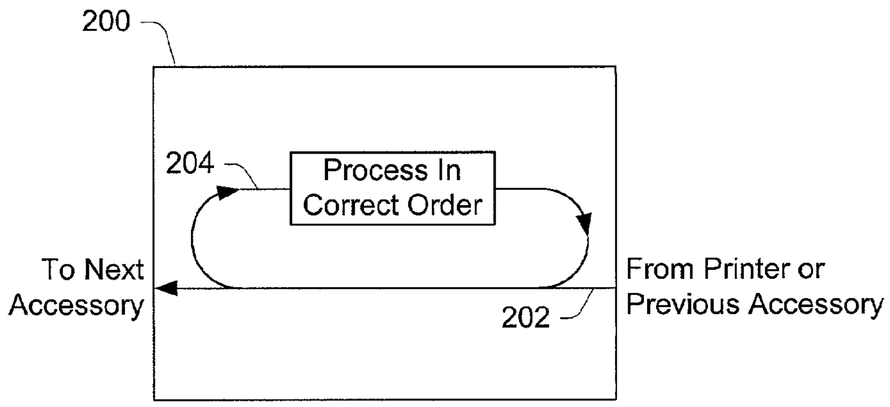
FIGS. 4A–4C illustrate various accessory devices that process print jobs in different ways.
Figure 4B:
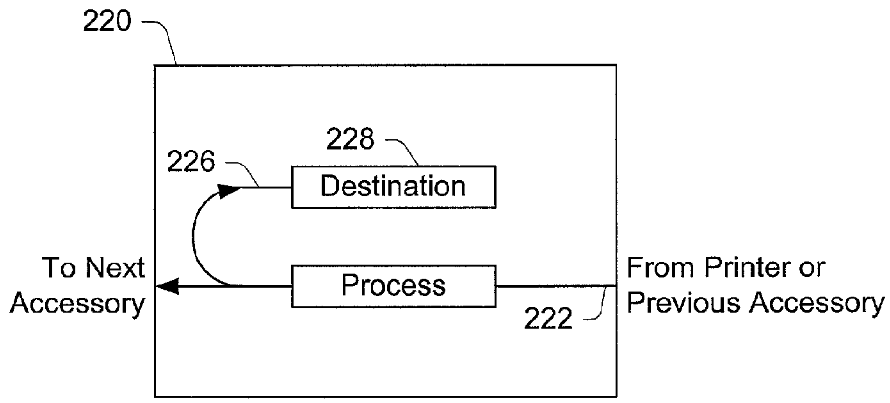
Figure 4C:
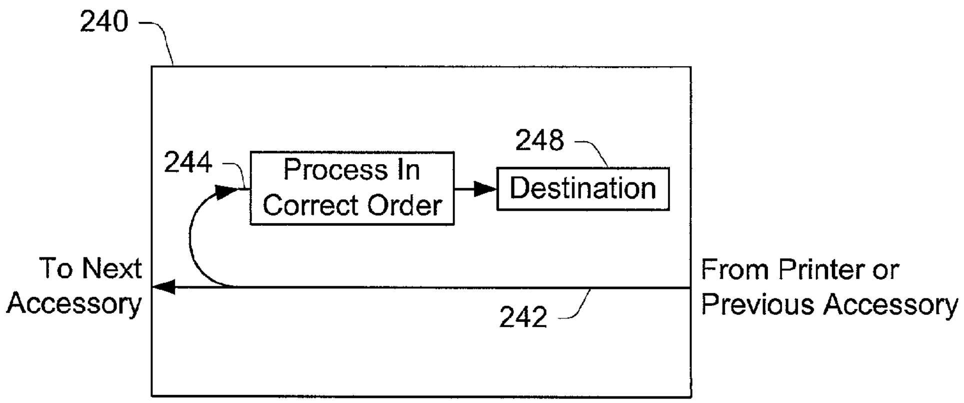

FIGS. 4A–4C illustrate various accessory devices that process print jobs in different ways. FIG. 4A illustrates an accessory device 200 that reverses the order of the printed pages prior to processing the pages. Pages are received on paper path 202 (e.g., from a printer or previous accessory device). If the pages are not to be processed by accessory device 200, then the pages continue straight-through the device to the next accessory device. However, if the pages are to be processed, then they follow the "reversing" path 204 and are processed in the correct order. After processing, the paper is returned to it's original orientation and sent to the next accessory device.

FIG. 4B illustrates an accessory device 220 that processes the pages, then sends the processed pages to the next accessory device or reverses the order and places the pages in a destination. Pages are received on paper path 222 which then processes each of the pages. After processing, the pages can continue to the next accessory device or can follow path 226 to a destination 228, such as a paper tray. In the embodiment of FIG. 4B, the accessory device 220 does not provide a path that does not process the pages. However, in alternate embodiments, the processing can be deactivated for a particular page or print job. Other embodiments provide an additional straight-through paper path that bypasses the processing performed on path 222. Any accessory device may be the destination for the print job, although the accessory device may not process the print job. For example, the sheets may follow the reversing path and be deposited into an output tray of the device.

FIG. 4C illustrates an accessory device 240 that can process the pages after reversing their orientation. Pages are received on straight-through paper path 242. The pages may be sent to the next accessory device or redirected to paper path 244, which "reverses" the pages. After reversing the pages, they are processed and placed in a destination 248. The device shown in FIG. 4C may be a stapler, a binder, or any other device that requires the pages to be in the correct order prior to processing. Also, once the pages are stapled or bound, they cannot be transmitted on the paper path, so the stapled or bound pages are placed in the destination 248.

Figure 5:
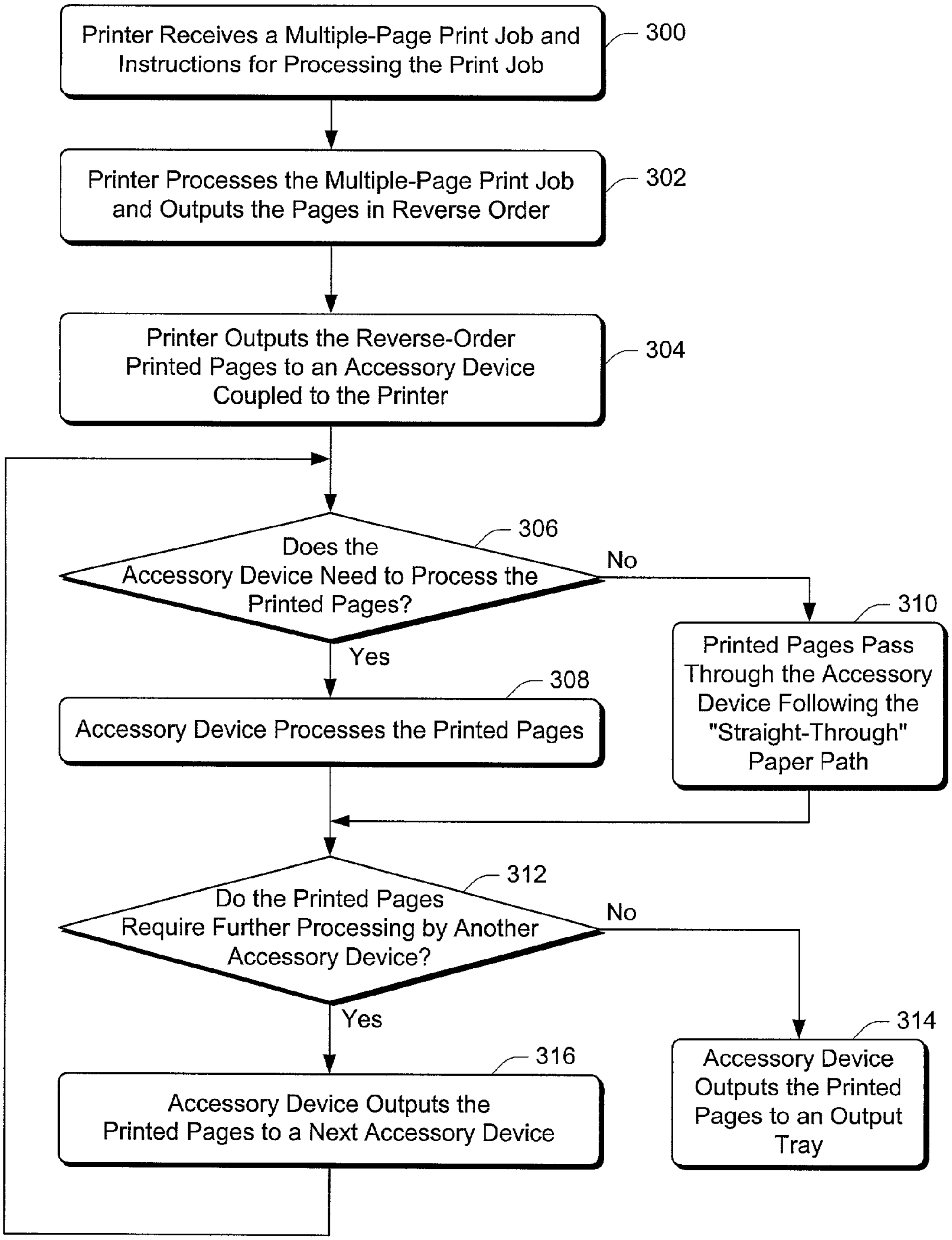
FIG. 5 is a flow diagram illustrating a procedure for processing a print job.

FIG. 5 is a flow diagram illustrating a procedure for processing a print job. Initially, the printer receives a multiple-page print job (e.g., from a server, workstation, or other device) and instructions for processing the print job (block 300). The printer processes the multiple-page print job and outputs the pages in reverse order (block 302). As discussed above, printing pages in reverse order refers to printing the first page face-up, then printing the second page face-up, and so on. The printer outputs the reverse-order printed pages to an accessory device coupled to the printer (block 304).

The procedure determines whether the accessory device needs to process the printed pages (block 306). For example, the instructions received by the printer along with the print job can be used to determine whether the accessory device needs to process the printed pages. If the accessory device needs to process the printed pages, then the appropriate processing is performed by the accessory device (block 308). If the accessory device does not need to process the printed pages, then the printed pages pass through the accessory device following the straight-through paper path (block 310), thereby leaving the printed pages in the same order and orientation as they were output from the printer.

Next, the procedure determines whether the printed pages require further processing by another accessory device (block 312). If the printed pages do not require any further processing, then the current accessory device outputs the printed pages to an output tray or other output mechanism (block 314). If the printed pages require processing by another accessory device, then the current accessory device outputs the printed pages to the next accessory device (block 316), which is coupled to the output of the current accessory device. The procedure then returns to block 306 to determine whether the next accessory device needs to process the printed pages. The procedure continues until either the last accessory device in the chain is reached or no further processing of the printed pages is necessary.

For example, referring to the printing system shown in FIG. 3, the printer 152 receives a multiple-page print job and processing instructions. The printer 152 processes the print job and prints the pages in reverse order. The printer outputs the printed pages to accessory device 154, which receives the printed pages on straight-through paper path 162. If accessory device does not need to process the printed pages, then the pages follow paper path 162 to the next accessory device 156. If the accessory device 154 needs to process the printed pages, then the pages are processed as they pass through the accessory device. If the order of the pages does not need to be reversed before processing, then the pages are processed as they move along printer path 162. If the order of the pages needs to be reversed before they are processed by the accessory device 154, then the pages are routed onto reversing paper path 164 to reverse the order of the pages received from the printer. After processing the pages in the proper order, the accessory device 154 may output the pages to the next accessory device 156 or output the pages to the output tray 166 or another output device.

In an alternative embodiment, the printed pages pass through all accessory devices in the "chain" until the last accessory device is reached, at which point the last accessory device outputs the printed pages. In this embodiment, the output for all print jobs is located at the same device, regardless of how the print job was processed and regardless of which accessory devices actually processed the printed pages. Accessory devices that do not perform any processing on the printed pages simply pass the pages through using the straight-through paper path. Since the output of the last accessory device in the chain is not coupled to another accessory device, the last accessory device outputs the printed pages to an output tray or other output mechanism.

Thus, a system for handling printed media is described herein. The system allows accessory devices coupled to a printer to reverse the order of printed pages generated by a printer. This system allows multiple accessory devices to be chained together such that each accessory device can either process the printed pages in reverse order (as output from the printer) or can reverse the order of the printed pages prior to processing. Further, each accessory device can simply pass the printed pages on to the next accessory device without processing the printed pages, using a straight-through paper path.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A printing system comprising:

a printer; and a first accessory device externally coupled to the printer and configured to receive printed pages from the printer, wherein the first accessory device contains a straight-through paper path and a reversing paper path to reverse the order of the printed pages received from the printer.

2. A printing system as recited in claim 1 wherein the reversing paper path reverses the order of the printed pages received from the printer prior to processing the printed pages.

3. A printing system as recited in claim 1 wherein the printer has an output coupled to the first accessory device, wherein the first accessory device receives printed pages from the printer output.

4. A printing system comprising:

a printer;

a first accessory device coupled to receive printed pages from the printer, wherein the first accessory device contains a straight-through paper path and a reversing paper path to reverse the order of the printed pages received from the printer; and a second accessory device coupled to receive printed pages from the first accessory device, wherein the second accessory device contains a straight-through paper path and a reversing paper path to reverse the order of the printed pages received from the first accessory device.

5. A printing system as recited in claim 1 wherein the straight-through paper path maintains the printed pages in the same order as received from the printer.

6. A printing system as recited in claim 1 further including a second accessory device coupled to receive printed pages from the first accessory device and a third accessory device coupled to receive printed pages from the second accessory device, wherein the second accessory device and the third accessory device each contain a straight-through paper path and a reversing paper path to reverse the order of the printed pages received from the previous accessory device prior to processing the printed pages.

7. A printing system as recited in claim 1 wherein the first accessory device is a stapler.

8. A printing system as recited in claim 1 wherein the first accessory device is a binding device.

9. A printing system as recited in claim 1 wherein the first accessory device inserts additional media into the printed pages.

10. A printing system as recited in claim 1 wherein the first accessory device is a hole punching device.

11. A printing system as recited in claim 1 wherein the first accessory device is a mailbox device with multiple locations to receive printed sheets.

12. A printing system as recited in claim 1 wherein the printer is a laser printer.

13. An accessory device capable of being coupled to receive printed pages from a previous device, the accessory device comprising:

a straight-through paper path that maintains the printed pages in the same order as received from the previous device; and a reversing paper path to reverse the order of the printed pages received from the previous device;

where the accessory device is configured to be removably coupled to the previous device and is external to the previous device.

14. An accessory device as recited in claim 13 wherein the reversing paper path reverses the order of the printed pages received from the previous device prior to processing the printed pages.

15. An accessory device as recited in claim 13 wherein the accessory device is coupled to an output of the previous device to receive printed pages from the previous device.

16. An accessory device as recited in claim 13 further including an output capable of being coupled to a second accessory device to allow the second accessory device to receive printed pages from the accessory device.

17. An accessory device as recited in claim 13 wherein the accessory device is configured to be coupled externally to a printing device and be configured as part of a chain of accessory devices that can be coupled together.

18. A method comprising:

generating a plurality of printed pages from a printing device;

outputting the plurality of printed pages, in reverse order, from the printing device to a first accessory device externally coupled to the printing device;

processing the received printed pages in the first accessory device, wherein the first accessory device has a straight-through paper path that maintains the printed pages in the same order as received from the printing device and a reversing paper path to reverse the order of the printed pages received from the printing device.

19. A method as recited in claim 18 further including outputting the plurality of printed pages from the first accessory device to a second accessory device coupled to the first accessory device.

20. A method as recited in claim 19 wherein the second accessory device has a straight-through paper path that maintains the printed pages in the same order as received from the first accessory device and a reversing paper path to reverse the order of the printed pages received from the first accessory device.

21. A method as recited in claim 18 further including communicating processing instructions from the printing device to the first accessory device.

22. A method as recited in claim 21 wherein the instructions determine whether the first accessory device is required to process the printed pages.

* * * * *